United States Patent
Geisler et al.

(10) Patent No.: US 12,316,821 B2
(45) Date of Patent: May 27, 2025

(54) MULTIVIEW DISPLAY SYSTEM AND METHOD WITH ADAPTIVE BACKGROUND

(71) Applicant: LEIA INC., Menlo Park, CA (US)

(72) Inventors: Daniel Geisler, Salida, CA (US); David A. Fattal, Mountain View, CA (US)

(73) Assignee: LEIA Inc., Menlo Park, CA (US)

( * ) Notice: Subject to any disclaimer, the term of this patent is extended or adjusted under 35 U.S.C. 154(b) by 84 days.

(21) Appl. No.: 18/122,037

(22) Filed: Mar. 15, 2023

(65) Prior Publication Data
US 2023/0217000 A1    Jul. 6, 2023

Related U.S. Application Data

(63) Continuation of application No. PCT/US2020/055946, filed on Oct. 16, 2020.
(Continued)

(51) Int. Cl.
*H04N 13/125* (2018.01)
*G06T 5/50* (2006.01)
(Continued)

(52) U.S. Cl.
CPC ............ *H04N 13/125* (2018.05); *G06T 5/50* (2013.01); *G06T 5/70* (2024.01); *H04N 13/15* (2018.05);
(Continued)

(58) Field of Classification Search
None
See application file for complete search history.

(56) References Cited

U.S. PATENT DOCUMENTS

| | | | |
|---|---|---|---|
| 6,532,008 B1 * | 3/2003 | Guralnick | H04N 13/125 348/E13.058 |
| 9,128,226 B2 | 9/2015 | Fattal et al. | |

(Continued)

FOREIGN PATENT DOCUMENTS

| | | |
|---|---|---|
| CA | 3193491 | 3/2022 |
| CN | 101123736 | 2/2008 |

(Continued)

OTHER PUBLICATIONS

International Search Report and Written Opinion (ISRWO) by International Searching Authority (ISA) Korean Intellectual Property Office (KIPO) dated Jun. 18, 2021 (10 pages) for foreign counterpart parent International Application No. PCT/US2020/055946.

(Continued)

*Primary Examiner* — Jeffrey J Chow
(74) *Attorney, Agent, or Firm* — Schwegman, Lundberg & Woessner, P.A.

(57) ABSTRACT

An adaptive background multiview image display system and method provides improved multiview image quality. Systems and methods may involve generating crosstalk data that reduces crosstalk between a first view of subject image and a second view of the subject image. The subject image may be a multiview image to be overlaid on a background image. A crosstalk violation may be detected in the subject image based on the crosstalk data. At least one of a color value or a brightness value of the background image is determined according to a degree of the crosstalk violation to generate the background image. The subject image may then be overlaid on the generated background image.

20 Claims, 10 Drawing Sheets

Related U.S. Application Data

(60) Provisional application No. 63/081,274, filed on Sep. 21, 2020.

(51) Int. Cl.
  *G06T 5/70* (2024.01)
  *H04N 13/15* (2018.01)
  *H04N 13/275* (2018.01)
  *H04N 13/282* (2018.01)

(52) U.S. Cl.
  CPC ......... *H04N 13/275* (2018.05); *H04N 13/282* (2018.05); *G06T 2207/20212* (2013.01)

(56) References Cited

U.S. PATENT DOCUMENTS

| | | |
|---|---|---|
| 9,201,270 B2 | 12/2015 | Fattal et al. |
| 9,298,168 B2 | 3/2016 | Taff et al. |
| 9,389,415 B2 | 7/2016 | Fattal et al. |
| 9,459,461 B2 | 10/2016 | Santori et al. |
| 9,557,466 B2 | 1/2017 | Fattal |
| 9,785,119 B2 | 10/2017 | Taff et al. |
| 10,345,505 B2 | 7/2019 | Fattal |
| 10,551,546 B2 | 2/2020 | Fattal |
| 10,649,128 B2 | 5/2020 | Fattal et al. |
| 10,798,371 B2 | 10/2020 | Fattal |
| 10,802,212 B2 | 10/2020 | Fattal |
| 10,830,939 B2 | 11/2020 | Fattal et al. |
| 10,884,175 B2 | 1/2021 | Fattal |
| 10,928,677 B2 | 2/2021 | Aieta et al. |
| 11,016,235 B2 | 5/2021 | Fattal et al. |
| 11,048,036 B2 | 6/2021 | Ma et al. |
| 2003/0117489 A1 | 6/2003 | Jones et al. |
| 2007/0228927 A1 | 10/2007 | Kindler et al. |
| 2008/0036696 A1 | 2/2008 | Slavenburg et al. |
| 2008/0246759 A1 | 10/2008 | Summers |
| 2009/0244266 A1 | 10/2009 | Brigham |
| 2009/0322986 A1 | 12/2009 | Wei et al. |
| 2010/0134493 A1 | 6/2010 | Kwak et al. |
| 2011/0279451 A1 | 11/2011 | Haga |
| 2012/0062709 A1 | 3/2012 | Kerofsky et al. |
| 2012/0257018 A1 | 10/2012 | Shigemura et al. |
| 2013/0135500 A1 | 5/2013 | Theuwissen |
| 2013/0169518 A1 | 7/2013 | Wu et al. |
| 2014/0022340 A1 | 1/2014 | Dane et al. |
| 2014/0085432 A1 | 3/2014 | Wu et al. |
| 2014/0192170 A1 | 7/2014 | Samadani et al. |
| 2016/0044305 A1* | 2/2016 | Kim ............... H04N 13/351 348/54 |
| 2016/0134859 A1 | 5/2016 | Tang |
| 2017/0111633 A1* | 4/2017 | Kang ............... H04N 13/317 |
| 2017/0363794 A1 | 12/2017 | Wan et al. |
| 2018/0252931 A1 | 9/2018 | Kim-Whitty |
| 2021/0364816 A1 | 11/2021 | Fattal et al. |
| 2021/0368158 A1 | 11/2021 | Fattal et al. |
| 2022/0075183 A1* | 3/2022 | Lee ............... B60K 35/10 |

FOREIGN PATENT DOCUMENTS

| | | |
|---|---|---|
| CN | 105376558 | 3/2016 |
| CN | 116195246 | 5/2023 |
| EP | 4214924 | 7/2023 |
| JP | 2000004455 A | 1/2000 |
| JP | 2009239596 | 10/2019 |
| JP | 2023545634 | 10/2023 |
| KR | 20080089649 | 10/2008 |
| KR | 20140051333 A | 4/2014 |
| KR | 20230061492 | 5/2023 |
| TW | 202220439 | 5/2022 |
| TW | 1830056 | 1/2024 |
| WO | 2012038856 A1 | 3/2012 |
| WO | 2012150033 | 11/2012 |
| WO | 2022060387 | 3/2022 |

OTHER PUBLICATIONS

Fattal, David et al., "A multi-directional backlight for a wide-angle, glasses-free three-dimensional display," Nature, Mar. 21, 2013, pp. 348-351, vol. 495, Macmillan Publishers Limited, 2013.

Kee, Edwin., "Hitachi Full Parallax 3D Display Offers Mind Bending Visuals," http://www.ubergizmo.com/2011/10/hitachi-full-parallax-3d-display-offers-mind-bending-visuals, Oct. 4, 2011, 2 pages.

Reichelt et al., "Holographic 3-D Displays—Electro-holography within the Grasp of Commercialization," Advances In Lasers and Electro-Optics, Optics, Nelson Costa and Adolfo Cartaxo (Ed.), (2010), pp. 683-711, ISBN: 978-953-307-088-9, InTech, Available from: http://www.intechopen.com/books/advances-in-lasers-and-electro-optics/holographic-3-ddisplays-electro-holography-within-the-grasp-of-commercialization.

Travis et al., "Collimated light from a waveguide for a display backlight," Optics Express, Oct. 2009, pp. 19714-19719, vol. 17, No. 22.

Xu et al., "Computer-Generated Holography for Dynamic Display of 3D Objects with Full Parallax," International Journal of Virtual Reality, 2009, pp. 33-38, vol. 8, No. 2.

Son, Jung-Young et al., "Three-Dimensional Imaging Methods Based on Multiview Images," IEEE/OSA Journal of Display Technology, Sep. 2005, pp. 125-140, vol. 1, No. 1.

"Korean Application Serial No. 10-2023-7011296, Notice of Preliminary Rejection mailed Mar. 26, 2024", w English Translation, 10 pgs.

"International Application Serial No. PCT US2020 055946, International Search Report mailed Jun. 18, 2021", 3 pgs.

"International Application Serial No. PCT US2020 055946, Written Opinion mailed Jun. 18, 2021", 5 pgs.

"International Application Serial No. PCT US2020 055946, International Preliminary Report on Patentability mailed Mar. 30, 2023", 7 pgs.

"European Application Serial No. 20954310.7, Response filed Oct. 24, 2023 to Communication pursuant to Rules 161(1) and 162 EPC filed May 2, 2023", 21 pgs.

"Taiwanese Application Serial No. 110131899, Office Action mailed Mar. 17, 2022", w English translation, 15 pgs.

"Taiwanese Application Serial No. 110131899, Response filed May 25, 2022 to Office Action mailed Mar. 17, 2022", 3 pgs.

"Taiwanese Application Serial No. 110131899, Office Action mailed Jun. 14, 2023", w English translation, 28 pgs.

"Taiwanese Application Serial No. 110131899, Response filed Sep. 14, 2023 to Office Action mailed Jun. 14, 2023", w English translation of claims, 16 pgs.

"Canadian Application Serial No. 3,193,491, Examiners Rule 86(2) Report mailed Jul. 23, 2024", 5 pgs.

"Canadian Application Serial No. 3,193,491, Response filed Nov. 19, 2024 to Examiners Rule (86(2) Report mailed Jul. 23, 2024", 4 pgs.

"European Application Serial No. 20954310.7, Extended European Search Report mailed Jul. 12, 2024", 8 pgs.

"European Application Serial No. 20954310.7, Response filed Oct. 30, 2024 to Extended European Search Report mailed Jul. 12, 2024", 19 pgs.

"Japanese Application Serial No. 2023-518114, Notification of Reasons for Refusal mailed Jul. 30, 2024", w/ English translation, 11 pgs.

"Korean Application Serial No. 10-2023-7011296, Response filed Jul. 17, 2024 to Notice of Preliminary Rejection mailed Mar. 26, 2024", w/ English claims, 19 pgs.

"Chinese Application Serial No. 202080105391.7, Office Action mailed Feb. 19, 25", w English Translation, 12 pgs.

"Japanese Application Serial No. 2023-518114, Examiners Decision of Final Refusal mailed Apr. 1, 25", W English Translation, 11 pgs.

* cited by examiner

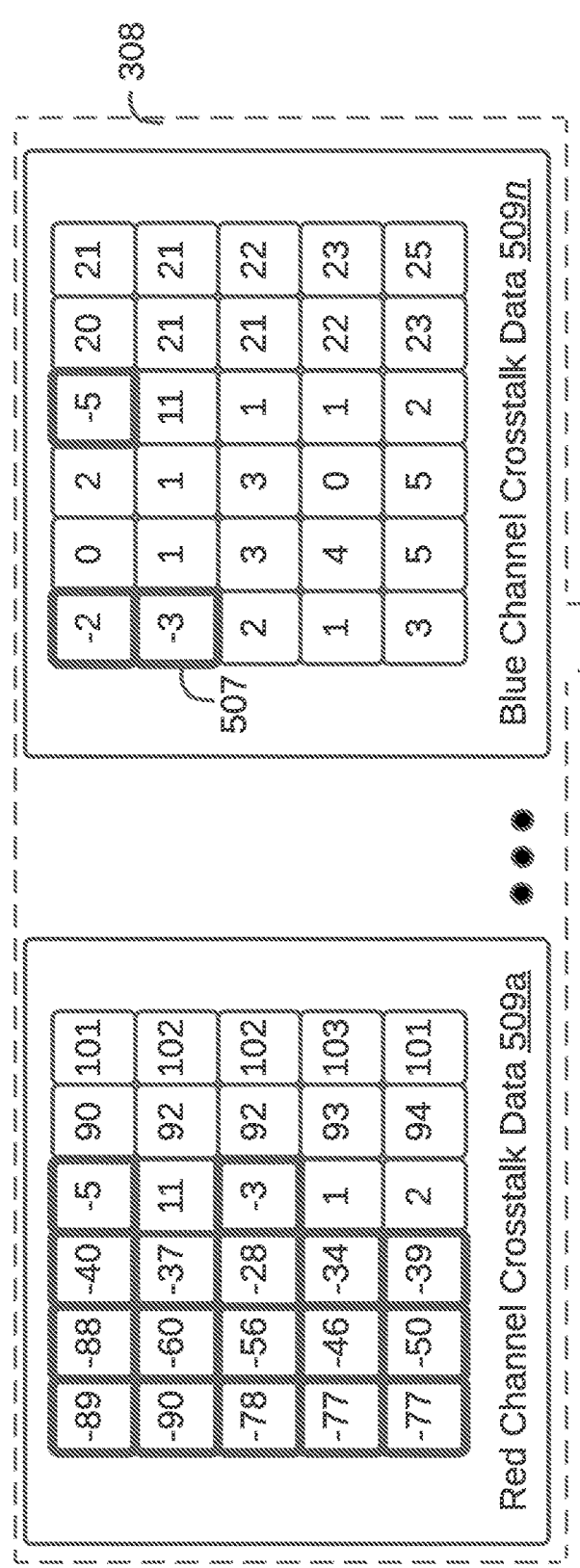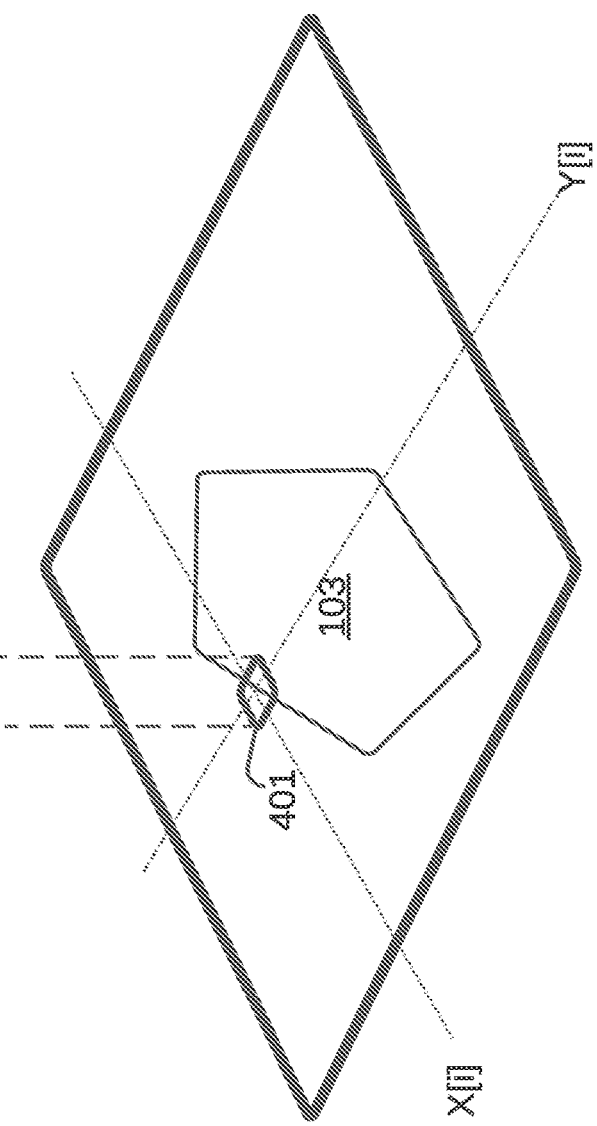
FIG. 5

MULTIVIEW DISPLAY SYSTEM AND METHOD WITH ADAPTIVE BACKGROUND

CROSS-REFERENCE TO RELATED APPLICATIONS

This application is a continuation application of and claims priority to International Patent Application No. PCT/US2020/055946, filed Oct. 16, 2020, which claims the benefit of priority to U.S. Provisional Patent Application Ser. No. 63/081,274, filed Sep. 21, 2020, the entirety of both of which is incorporated by reference herein.

STATEMENT REGARDING FEDERALLY SPONSORED RESEARCH OR DEVELOPMENT

N/A

BACKGROUND

An object in three-dimensional (3D) space may be viewed from multiple perspectives depending on the viewing angle. In addition, when viewed by a user with stereoscopic vision, multiple views representing different perspectives of the object may be perceived contemporaneously, effectively creating a sense of depth that may be perceived by the user. Multiview displays present images having multiple views to represent how objects are perceived in the 3D world. A multiview display renders different views contemporaneously to provide a realistic experience to the user. However, by presenting different views contemporaneously, it is possible that at certain points along the display, portions of two or more views may interfere with one another, resulting in a less desirable viewing experience. Specifically, a portion of one view may leak onto a second view. This phenomenon is referred to as 'crosstalk.' and represents a potentially undesirable consequence of attempting to present multiple views of an object or 3D space using a multiview display.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which:

FIG. 5 illustrates an example of analyzing crosstalk violations, according to an embodiment consistent with the principles described herein.

Certain examples and embodiments have other features that are one of in addition to and in lieu of the features illustrated in the above-referenced figures. These and other features are detailed below with reference to the above-referenced figures.

DETAILED DESCRIPTION

Examples and embodiments in accordance with the principles described herein provide improved quality of a multiview image as it is perceived by a user by adapting the background to mask or hide visual artifacts that may be present in the multiview image. In particular, according to some embodiments, a multiview image may be processed by a crosstalk cancellation operation that, while reduces undesirable crosstalk, may introduce visual artifacts such as, for example, ghosting along the edges of an object in the multiview image. By tracking crosstalk violations resulting from performing a crosstalk cancellation operation, a background image may have visual parameters (e.g., color, brightness) modified based on the presence, degree, or location of the crosstalk violations. As a result, the overall color, tint, brightness, or intensity of the background image may by modified to mask or hide any ghosting effects resulting from crosstalk cancellation operation. In other embodiments, the background image may be modified at specific locations based on what portions of the multiview image corresponds with crosstalk violations. Visual effects such as a halo, color gradient, or other color/brightness effects may be applied to the background image to improve the perceived image quality of the multiview image after it is overlaid on the background image. Thus, the background image is 'adaptive' such that its visual properties are modified to improve the viewing experience of the foreground of the multiview image.

Figure 1:
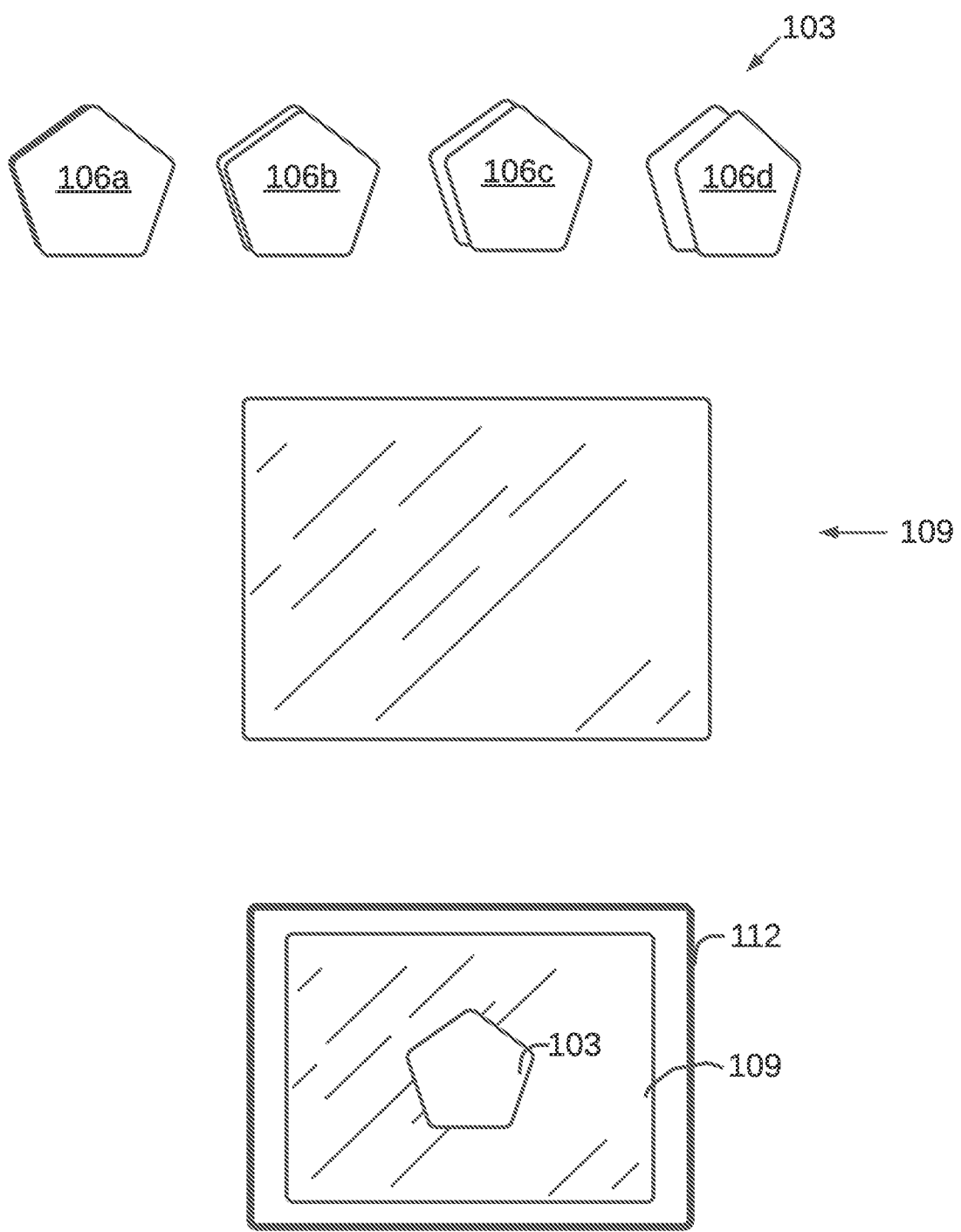
FIG. 1 illustrates a multiview image in an example, according to an embodiment consistent with the principles described herein.

FIG. 1 illustrates a multiview image 103 in an example, according to an embodiment consistent with the principles described herein. The multiview image 103 has a plurality of views such as, for example, a first view 106*a*, a second view 106*b*, a third view 106*c*, and a fourth view 106*d*. Each of the views 106*a-d* corresponds to a different view direction. The multiview image 103 shown in FIG. 1 is a polygon having a particular depth. In the first view 106*a*, the multiview image 103 is shown such that a majority of its depth is hidden. However, as a user changes the perspective from the second view 106*b* to the third view 106*c* and on to the fourth view 106*d*, the depth of the multiview image becomes increasingly perceivable. While four views 106*a-d* are shown, the present disclosure is directed to any number of multiple views. In addition, the multiview image 103 of FIG. 1 is visualized as a perceivable image having different views 106*a-d* however, when processed for display, the multiview image 103 is stored as data in a format that records the different perspectives of the image.

The multiview image 103 may be referred to as a subject image that represents an item of interest to the user. A subject image may be an item for sale, an artifact, a model, or any other item that represents a physical object. The subject image may be overlaid on a background image 109, where the background is intended to not distract the user from the subject image. In this respect, the background image 109 is an image that is intended to guide the user's attention towards the subject image.

The multiview image 103 overlaid on a background forms a final image that is rendered by a multiview display 112. A user may perceive different views of the multiview image 103 by physically moving his or her eyes at different angles relative to the multiview display. In other examples, the user may perceive different views of the multiview image 103 by touching, swiping, or moving a curser or controller to instructing the multiview display 112 to rotate the multiview image 103. The different views 106a-d of the multiview image 103 may be presented contemporaneously by the multiview display 112. Each view 106a-d is presented by the multiview display 112 at different, corresponding principal angular directions. When presenting the multiview image 103 for display, the views 106a-d actually appear on or in a vicinity of the multiview display 112. A 2D display may be substantially similar to the multiview display 112, except that the 2D display is generally configured to provide a single view (e.g., only one of the views 106a-d) as opposed to the different views 106a-d of the multiview image 103.

Herein a 'two-dimensional display' or '2D display' is defined as a display configured to provide a view of an image that is substantially the same regardless of a direction from which the image is viewed (i.e., within a predefined viewing angle or range of the 2D display). A conventional liquid crystal display (LCD) found in many smart phones and computer monitors are examples of 2D displays. In contrast herein, a 'multiview display' is defined as an electronic display or display system configured to provide different views of a multiview image in or from different view directions contemporaneously from the user's perspective. In particular, the different views 106a-d may represent different perspective views of a multiview image 103.

The multiview display 112 may be implemented using a variety of technologies that accommodate the presentation of different image views so that they are perceived contemporaneously. One example of a multiview display is one that employs diffraction gratings to control the principle angular directions of the different views 106a-d. Herein, a 'diffraction grating' is generally defined as a plurality of features (i.e., diffractive features) arranged to provide diffraction of light incident on the diffraction grating. In some examples, the plurality of features may be arranged in a periodic or quasi-periodic manner. For example, the diffraction grating may include a plurality of features (e.g., a plurality of grooves or ridges in a material surface) arranged in a one-dimensional (1D) array. In other examples, the diffraction grating may be a two-dimensional (2D) array of features. The diffraction grating may be a 2D array of bumps on or holes in a material surface, for example. It should be appreciated that the multiview display 112 may be implemented using structures other than diffractive gratings.

According to some embodiments, the multiview display 112 may be a lightfield display, which is one that presents a plurality of light beams of different colors and different directions corresponding to different views. In some examples, the lightfield display is a so-called 'glasses free' three-dimensional (3-D) display that may use diffractive gratings to provide autostereoscopic representations of multiview images without the need to special eye wear to perceive depth.

As illustrated in FIG. 1, the multiview display 112 comprises a screen to display a multiview image 103 overlaid on a background image 109. The screen may be a display screen of a telephone (e.g., mobile telephone, smart phone, etc.), a tablet computer, a laptop computer, a computer monitor of a desktop computer, a camera display, or an electronic display of substantially any other device, for example.

Figure 2:
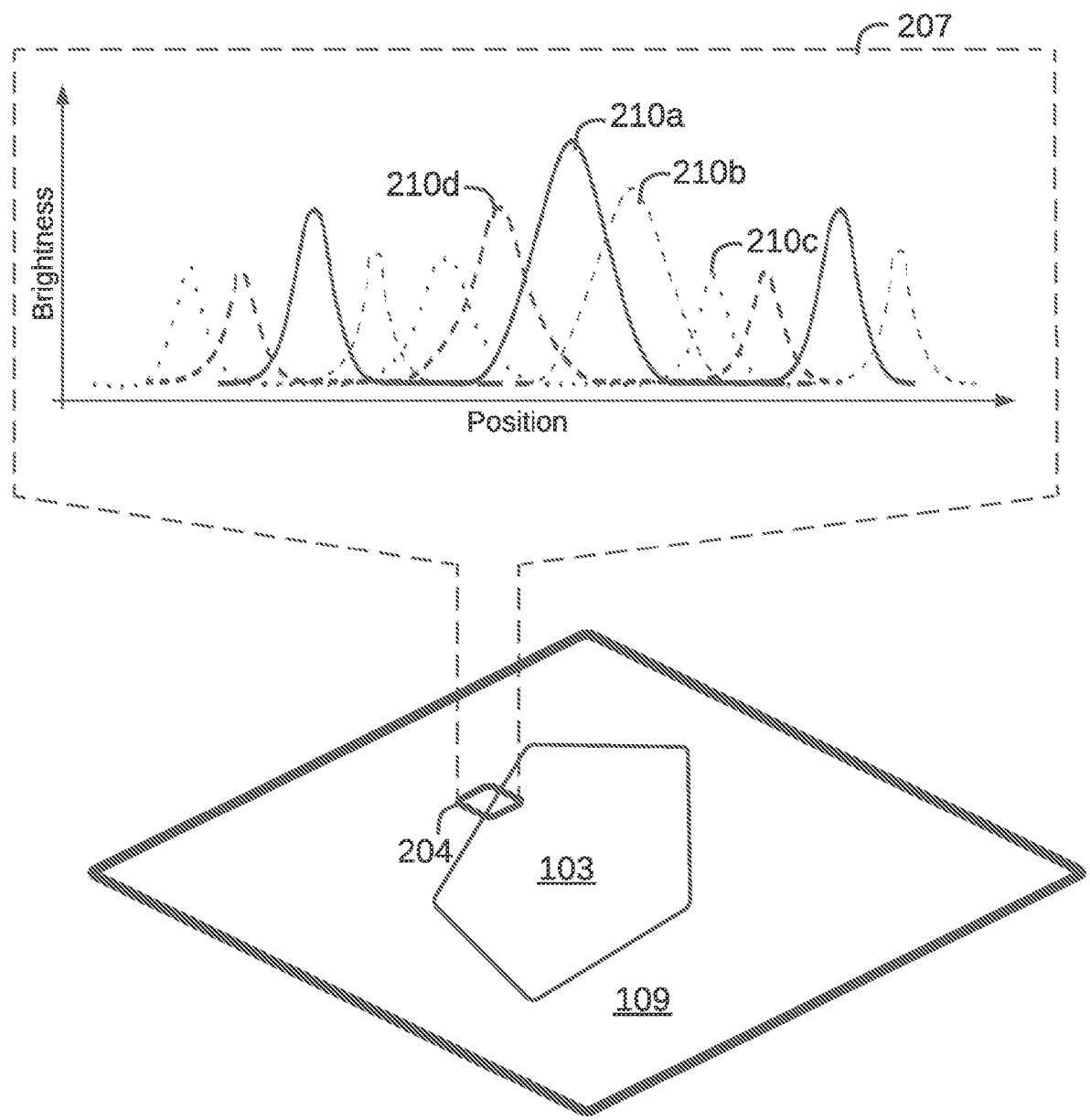
FIG. 2 illustrates an example of crosstalk consistent with the principles described herein.

FIG. 2 illustrates an example of crosstalk, according to an embodiment consistent with the principles described herein. Herein 'crosstalk' is defined as the blending of at least two views of a multi view image. For example, at a particular viewing perspective that is intended to display a first view 106a, crosstalk may occur where a faint representation of the second view 106b is presented. To this end, crosstalk may be an undesirable effect in displaying a multiview image 103.

FIG. 2 depicts the presentation of a multiview image 103 at a particular viewing angle (e.g., a perspective). In this example, a first view 106a of the multiview image is intended to be presented to the user. Likewise, other views 106b-d are intended to not be presented to the user at this particular viewing angle. Also shown is a portion 204 of the multiview image 103. The portion 204 encompasses an area made up of one or more pixels of the multiview image 103. The example of FIG. 2 shows a portion 204 along the edge of the multiview image 103. The visual contents contained within the portion 204 may be graphically represented in the color space 207. The color space 207 shown in FIG. 2 graphically represents the brightness or intensity of a particular color(s) across a physical range defined by the boundaries of the portion 204 of the multiview image 103. The brightness of a color for each view 106a-d is shown graphically in the color space 207. Specifically, with respect to viewing the portion 204 at a particular viewing angle, the first view 106a has a first brightness level 210a (shown as a solid line), the second view 106b has a second brightness level 210b (shown as a thin dashed line), the third view 106c has a third brightness level 210c (shown as a dotted line), and the fourth view 106d has a fourth brightness level 210d (shown as a thicker dashed line).

If crosstalk were not present, the brightness of only a single view would be present while the brightness for other views would be negligible. However, in the example of FIG. 2, when viewing the portion 204 at a particular angle, the first view 106a is perceived at the brightest level while other views 106b-d leak into the first view 106a. Reducing this crosstalk is discussed in further detail with respect to FIG. 3. In this example, the first view 106a is the intended view, having the first brightness level 210a that is the highest brightness level, relatively. The other views 106b-d are considered unintended views and may have corresponding brightness levels 210b-d that leak into the first view 106a.

Figure 3:
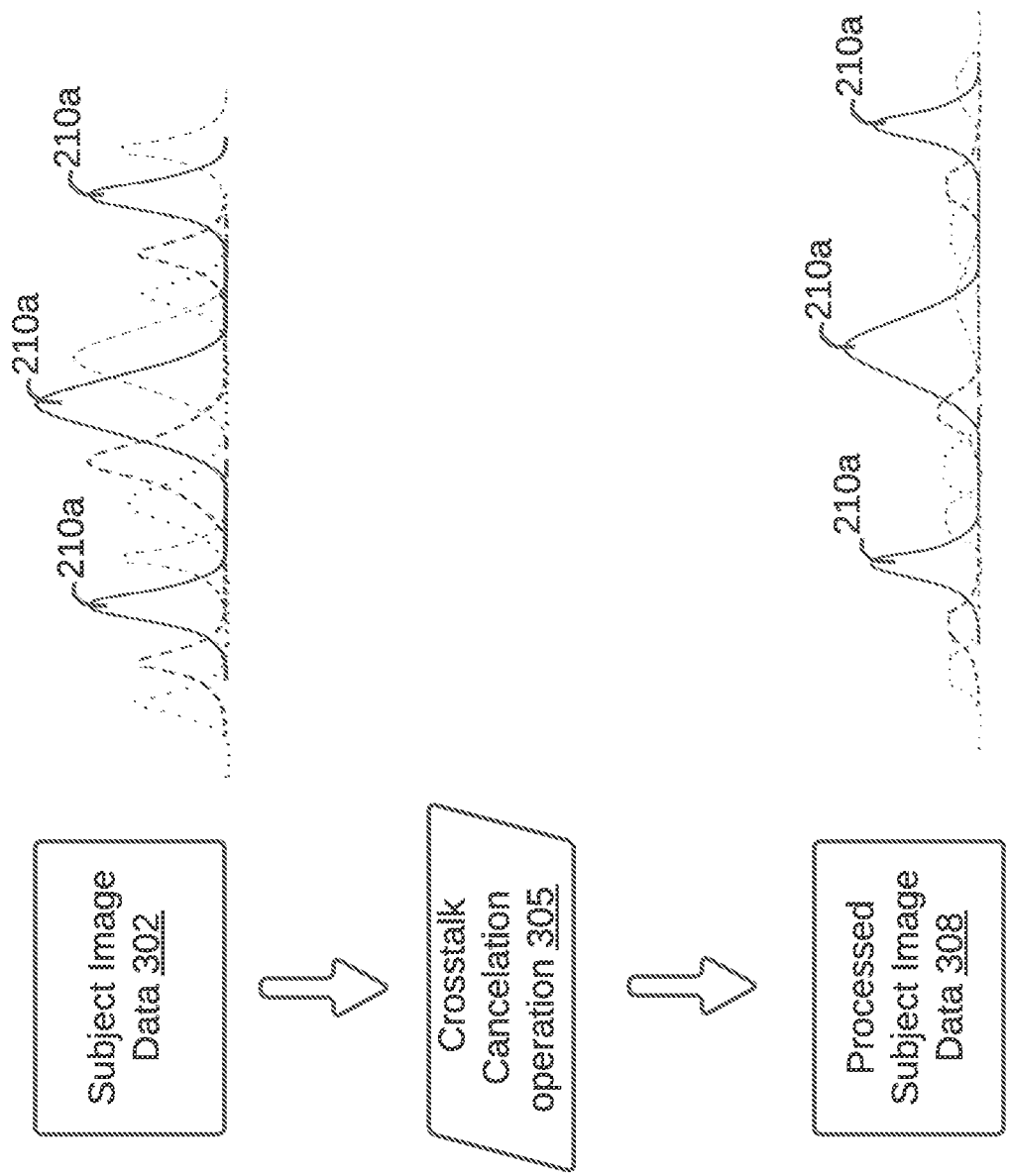
FIG. 3 illustrates an example of a crosstalk cancellation process consistent with the principles described herein.

FIG. 3 illustrates an example of crosstalk cancellation, according to an embodiment consistent with the principles described herein. Herein, crosstalk cancellation may be referred to as an anti-crosstalk (ACT) operation. Crosstalk cancellation begins by receiving a multiview image and converting into subject image data 302. The subject image data 302 may be a matrix of pixel values for each view 106a-d of the multiview image. A pixel value may be a numeric value that represents the color of the pixel for a given color channel. For example, the multiview image 103 may be formatted in an RGB-type format such that it is expressed as a red pixel value in the red (R) channel, a green pixel value in the green (G) channel, and a blue pixel value in the blue (B) channel. An RGB-type format is an example of an image format that is defined by a plurality of color channels including, but not limited to red, green, and blue.

To illustrate, a pure red image may have a large red pixel value while having a negligible green pixel value and a negligible blue pixel value. In some image formats, the pixel value ranges from zero to two hundred fifty-five (0-255). A pixel value of zero for a particular color means that the color is completely absent in the pixel (e.g., the particular color has zero intensity or brightness), while a pixel value of two hundred fifty-five represents a maximum intensity or brightness of the particular color. In some embodiments, the subject image data 302 may represented a multiview image 103 that is overlaid on a default background. The default background may be a pure black background where the pixel values for each color channel are zero. As shown in FIG. 3, when graphically representing the subject image data 302 at a particular view of a particular portion (e.g., the portion 204 of FIG. 2), the first brightness level 210a of the first view 106a is dominant while other brightness levels 210b-d of different views 106b-d may leak into and interfere with the first view 106a.

A crosstalk cancellation operation 305 is performed on the subject image data 302. The crosstalk cancellation operation 305 may involve implementing an algorithm that performs matrix arithmetic operations. For example, the crosstalk cancellation operation 305 may involve performing a matrix subtraction operation where pixels values of unintended views (e.g., the second view 106b, the third view 106c, the fourth view 106d) are subtracted from the total corresponding pixel value. To illustrate by way of example, a first pixel may have a specific pixel value for a particular color channel. This pixel may be directed to produce a light beam for a first view 106a. The pixel values for this color channel pertaining to views other than the first view 106a may be subtracted from this specific pixel value. Put another way, the specific pixel value is the sum of the constituent pixel values of different views 106a-d. By removing all constituent pixel values (e.g., by performing a subtraction operation) corresponding to unintended views, the result yields a pixel value for the intended view.

Applying a crosstalk cancellation operation 305 to subject image data 302 results in processed subject image data 308. The processed subject image data 308 represents the multiview image 103 with crosstalk reduced. When graphically represented in the color space, the first brightness level 210a for the first view 106a (e.g., the intended view for a particular perspective) may be slightly modified, while the brightness levels 210b-d for the other views 106b-d (e.g., the unintended views for the particular perspective) are suppressed or otherwise attenuated to reduce crosstalk. FIG. 3 shows how the first brightness level 210a is isolated in response to performing the crosstalk cancellation operation 305. It should be noted that the crosstalk cancellation operation 305 modifies the multiview image 103 by isolating the different views 106a-d to reduce crosstalk. The processed subject image data 308 may be formatted as one or more matrices representing the pixel values at different color channels of the multiview image 103 after performing the crosstalk cancellation operation 305.

Figure 4:
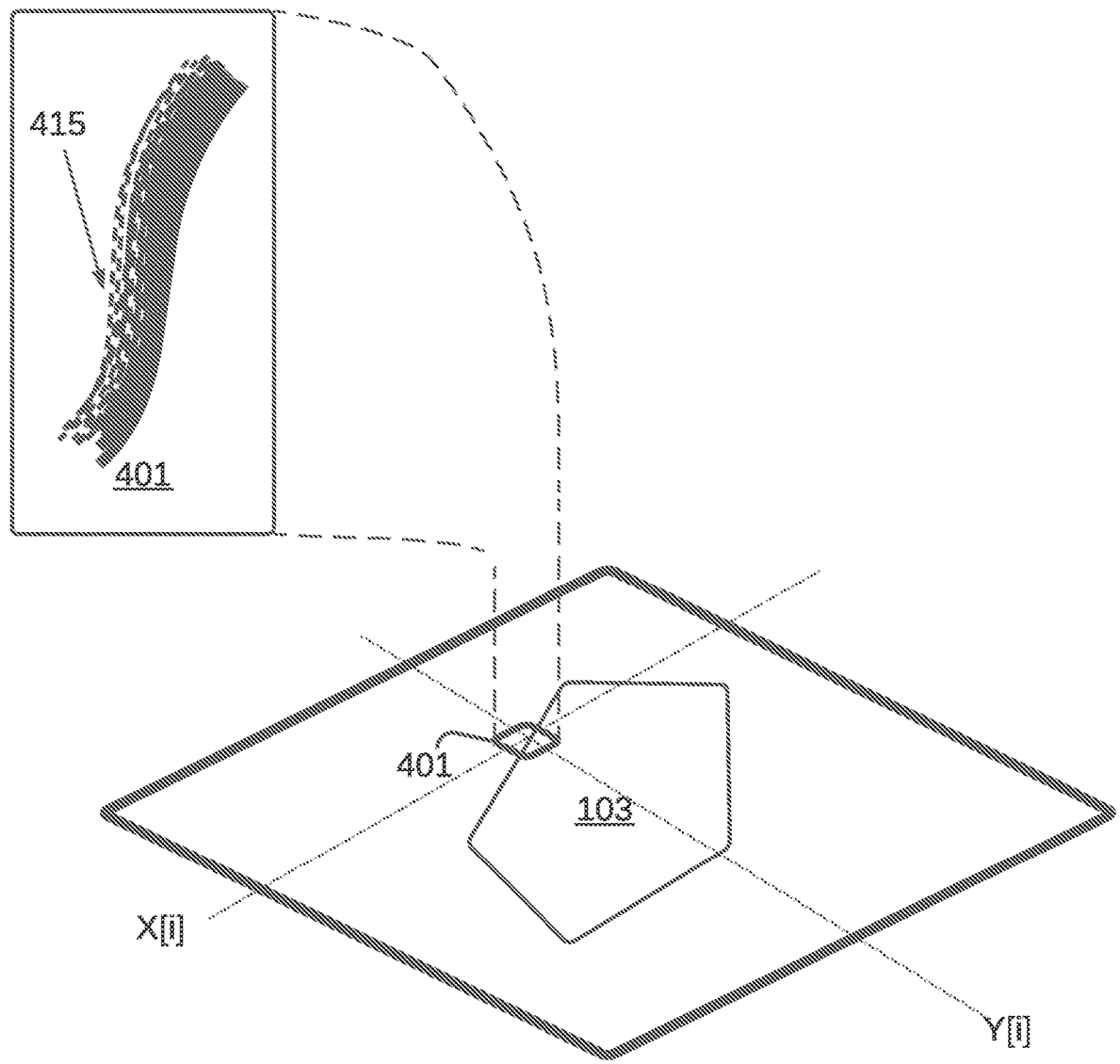
FIG. 4 illustrates an example of a visual artifact resulting from a crosstalk cancellation operation consistent with the principles described herein.

FIG. 4 illustrates an example of a visual artifact resulting from a crosstalk cancellation operation 305, according to an embodiment consistent with the principles described herein, crosstalk cancellation operation 305 may involve matrix operations where pixel values of unintended views (views 106b-d) are subtracted to isolate the pixel values of the intended view (e.g., the first view 106a). The crosstalk cancellation operation 305 may introduce inadvertent visual artifacts that degrade the multiview image 103. FIG. 4 shows how, after a crosstalk cancellation operation 305, a particular portion 401 of the multiview image 103 may have a 'ghosting' effect 415. This portion 401 may be identified according to coordinates along the display (shown as X[i], [Y[i]). These coordinates allow a location of the portion 401 to be identified and referenced.

The ghosting effect 415 may appear visually as a blur or as a sharpness along a boundary or edge of the multiview image 103. The ghosting effect 415 may degrade the image and hinder the user's viewing experience from perceiving clear, sharp, multiview images 103 rendered on the multiview display 112.

The 'ghosting effect' (e.g., ghosting effect 415), as defined herein is a visual artifact that may be caused by performing matrix subtraction operations leading to 'negative pixels.' A 'negative pixel' is defined as a pixel having a negative pixel value in response to performing a pixel operation (e.g., a crosstalk cancellation operation 305). A negative pixel is a physical impossibility and may thus be treated as a pixel having a pixel value of zero at the time of rendering the pixel for display. In other words, image formats, such as, for example, an RGB-type format, has a predefined range for pixel values within each color channel. Pixel values calculated to be negative (or below the range) and automatically rendered as being at the minimum end of the range (e.g., zero).

The ghosting effect 415 may occur at or near the edges of the multiview image 103, when it is overlaid on a black background. Operations that subtract color from black or dark pixels may result in negative pixel. This may lead to the ghosting effect 415. As discussed herein, generating an adaptive background may reduce the appearance of the ghosting effect 415. Embodiments are direct to improving the visual quality of the subject image on a multiview display 112 by generating an adaptive background for the subject image. By tracking the negative pixels in response to a crosstalk cancellation operation 305, the background may be generated by modifying different visual parameters (e.g., color, tint, brightness) without changing the subject image. As a result, a visually pleasing, crosstalk-free, multiview image 103 may be rendered on a multiview display 112. As defined herein, 'crosstalk-free' refers to a multiview image that has been processed by a crosstalk cancellation operation to remove crosstalk from the multiview image.

Further, as used herein, the article 'a' is intended to have its ordinary meaning in the patent arts, namely 'one or more'. For example, 'a processor' means one or more processor and as such, 'the memory' means 'one or more memory components' herein.

According to some embodiments of the principles described herein, adapting a background of a multiview image 103 is provided. FIG. 5 illustrates an example of analyzing crosstalk violations in an example, according to an embodiment consistent with the principles described herein. Crosstalk violations are tracked in response to performing a crosstalk cancellation operation 305. Crosstalk violations may be tracked with respect to their location in a coordinate system, the degree of violation, or both. Crosstalk violations are then used to generate a background image 109 that masks a potential ghosting effect 415 resulting from performing a crosstalk cancellation operation 305, according to various embodiments.

FIG. 5 provides an example in which a subject image has been received. As illustrated in FIG. 5, the subject image is a multiview image 103. In some embodiments, the subject image, which is a multiview image 103 is generated by segmenting out a foreground image (e.g., the subject) from its original background prior to generating the adaptive background. For example, a disparity-based segmentation process may extract the subject from an image to generate the subject image. The different views of the subject image are maintained to ensure that it continues to be handled as a multiview image 103.

The subject image, which is the multiview image 103 shown in FIG. 5, is processed according to a crosstalk cancellation operation 305 to generate processed subject image data 308. As explained above, the crosstalk cancellation operation 305 accounts for different views 106a-d of the subject image and minimizes leakage between these different views 106a-d. The processed subject image data 308 may be expressed as matrix of pixel values for each color channel of the subject image. In this respect, the crosstalk cancellation operation 305 is performed for each color channel of the subject image. There are at least two pieces of information contained in the crosstalk cancellation operation 305. First, there are the new pixel values of the subject image that are generated to reduce crosstalk in the subject image. This is used to ultimately render the subject image on a multiview display 112 with crosstalk minimized. Second, there are crosstalk violations, e.g., a crosstalk violation 507 illustrated in FIG. 5. Crosstalk violations are determined based on a negative pixel value in the subject image after a crosstalk cancellation operation 305 is performed on the subject image. In other words, the presence of a negative pixel may indicate a crosstalk violation.

FIG. 5 shows crosstalk data 509a-n generated for each color channel. There may be red channel crosstalk data 509a ranging to blue channel crosstalk data 509n. The crosstalk data 509a-n for each color channel make up the processed subject image data 308 used to generate a crosstalk-free, multiview subject image. FIG. 5 also shows the pixel values for each color channel at a particular portion 401 of the subject image. For example, the pixel values are arranged in a two-dimensional matrix, where each pixel value corresponds to a pixel within the particular portion 401. Each pixel may have a corresponding coordinate to locate the pixel with respect to the image as a whole. In this example, the particular portion 401 encompasses an area that spans six pixels across and give pixels down, thereby making matrix of thirty pixels, each pixel having a pixel value for each color channel. An upper right-most pixel has a red pixel value of one hundred one (101) and a blue pixel value of twenty-one (21). These pixel values for the upper right-most pixel may have been modified in response to performing a crosstalk cancellation operation 305 using an original subject image, for example. While FIG. 5 shows a particular portion 401 containing multiple pixels, it should be appreciated that the particular portion 401 may contain a single pixel, in some embodiments.

As shown in FIG. 5, the crosstalk cancellation operation 305 may have generated crosstalk violations for particular pixels at particular color channels. A crosstalk violation may be determined by comparing the pixel value at a particular color channel to a threshold pixel value (e.g., zero). In this example, all pixels having pixel values falling below zero are considered as pixels corresponding to a crosstalk violation. This is shown as pixels having a thicker box around the pixel value in FIG. 5. It should be noted that some pixels correspond to crosstalk violations for specific color channels. For example, the lower left-most pixel in the portion 401 has a crosstalk violation in the red channel (e.g., a pixel value of minus seventy-seven (−77)) while it does not correspond to a crosstalk violation in the blue channel (e.g., a pixel value of three (3)), as illustrated.

According to various embodiments, the crosstalk violations (e.g., crosstalk violation 507) may be tracked. Tracking crosstalk violations may involve identifying and recording the location of the crosstalk violation, analyzing the degree of crosstalk violation, or otherwise quantifying the extent of the crosstalk violation. This is discussed in further detail below. While the crosstalk violations are tracked, the processed subject image data 308 may have the pixel values corresponding to crosstalk violations set to zero to allow the subject image to be rendered without negative pixels. However, by tracking the crosstalk violations, an adaptive background is generated to mitigate or even obscure the ghosting effect 415 that may be perceived by the user after performing the crosstalk cancellation operation 305.

Figure 6:
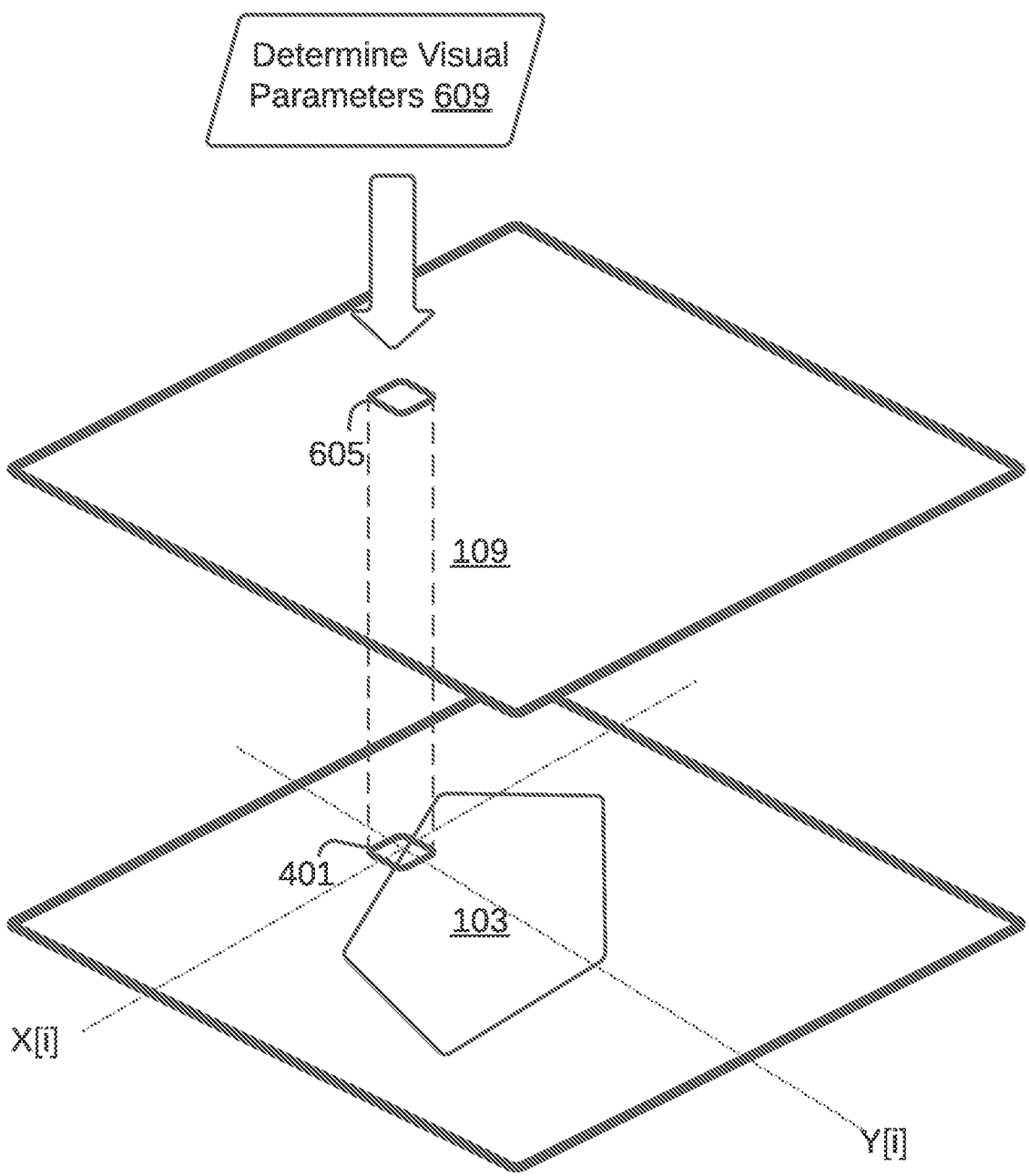
FIG. 6 illustrates an example of adapting a background of a multiview image, according to an embodiment consistent with the principles described herein.

FIG. 6 illustrates an example of adapting a background of a multiview image 103, according to an embodiment consistent with the principles described herein. Crosstalk violations (e.g., a crosstalk violation 507 shown in FIG. 5) may be identified at various locations of a subject image. FIG. 6 shows an example of a portion 401 of the subject image (referenced as the multiview image 103) that contains at least one pixel corresponding to a crosstalk violation. It should be appreciated that there may be several pixels or portions of pixels scattered about the subject image that may correspond to crosstalk violations.

Based on the tracking of one or more crosstalk violations, a background image 109 that is adaptive (i.e., an adaptive background image) may be generated. The background image 109 may be generated from a default background that is modified so as to mask or otherwise visually hide the ghosting effect 415 created by the crosstalk cancellation operation 305. For example, the portion 401 containing one or pixels of the subject image may be mapped to a corresponding location on the background image 109. For example, the coordinates of the portion 401 of the subject image may be mapped to a corresponding portion 605 of the background image 109.

Upon identifying the location of the corresponding portion 605 of the background image 109, one or more visual parameters 609 may be determined and then applied to modify the background image 109. The visual parameters 609 may correspond to a tint, brightness, intensity, pixel value for a particular color channel. In one embodiment, the pixel value of the background image 109 is set for each pixel corresponding to a crosstalk violation (e.g., crosstalk violation 507) according to the location and degree of crosstalk violation. For example, assume that a specific pixel has a red channel pixel value of minus seventy (−70) within a subject image after performing a crosstalk cancellation operation 305 on the subject image. This means that the specific pixel is blacker than black, a physical impossibility and therefore is a crosstalk violation. When displaying the subject image that underwent crosstalk cancellation, the specific pixel may have a red pixel value of zero, to indicate no presence of red color in the specific pixel. In this respect, setting negative pixel values to zero effectively introduces color into the crosstalk-free subject image. When generating the background image 109, the location of the specific pixel may be mapped to the background image 109 to identify the corresponding background image pixel. The corresponding background image pixel may have its red pixel value increased to mitigate or compensate for the removal of the crosstalk violation. For example, the specific pixel above may have its red pixel value increased by seventy (70) to effectively reintroduce the red color that was introduced as a result of the crosstalk cancellation operation 305. By selectively increasing the color or brightness values of the background image, the increased color or brightness of the background compensates and matches the increased color or brightness resulting from crosstalk violation removal of the subject image.

According to some embodiments, an increase of the pixel value may be applied on a pixel-by-pixel basis for each pixel that corresponds to a crosstalk violation. As a result, individual pixels of the background image 109 may have its pixel values for different color channels modified based on the location or degree of crosstalk violations of the subject image.

In other embodiments, the portion 401 may comprise multiple pixels. An average pixel value may be calculated for the portion 401 for each color channel. The average pixel value may be a negative value if the portion 401 contains a high degree of crosstalk violations. The portion 401 may be mapped to the corresponding portion 605 of the background image 109. A visual parameter 609 may be applied to the corresponding portion 605 of the background image 109 based on the average pixel value. Applying a visual parameter 609 may involve increasing the pixel value of the background image 109 by the average pixel value of the portion 401, according to some embodiments. Further, visual parameters 609 may be applied to the background image 109 for each color channel.

In some embodiments, the degree of crosstalk violation is quantified and the visual parameters 609 may be applied globally to the background image 109 without accounting for the specific location(s) of the crosstalk violation(s). For example, for a given color channel, the average pixel value for all negative pixels may be calculated. The color channel for the background image 109 may have its pixel values increased by this average pixel value on a global level. Thus, the visual parameters 609 may be applied globally by adjusting the color, tint, or brightness of the background image 109, as a whole.

Figure 7A:
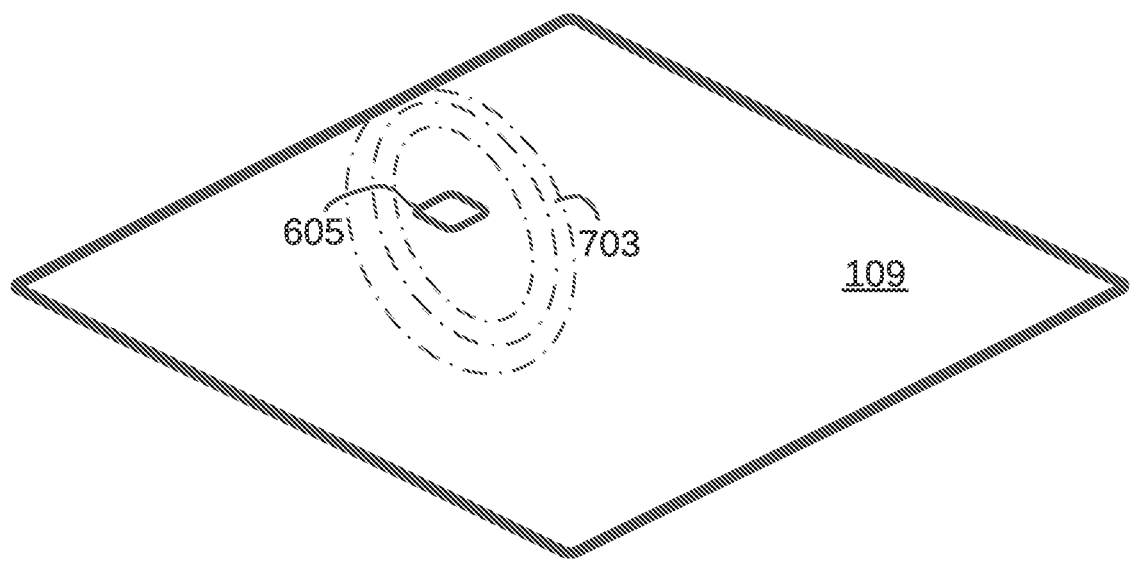
FIGS. 7A and 7B illustrate an adaptive background having a halo effect in an example, according to an embodiment consistent with the principles described herein.
Figure 7B:
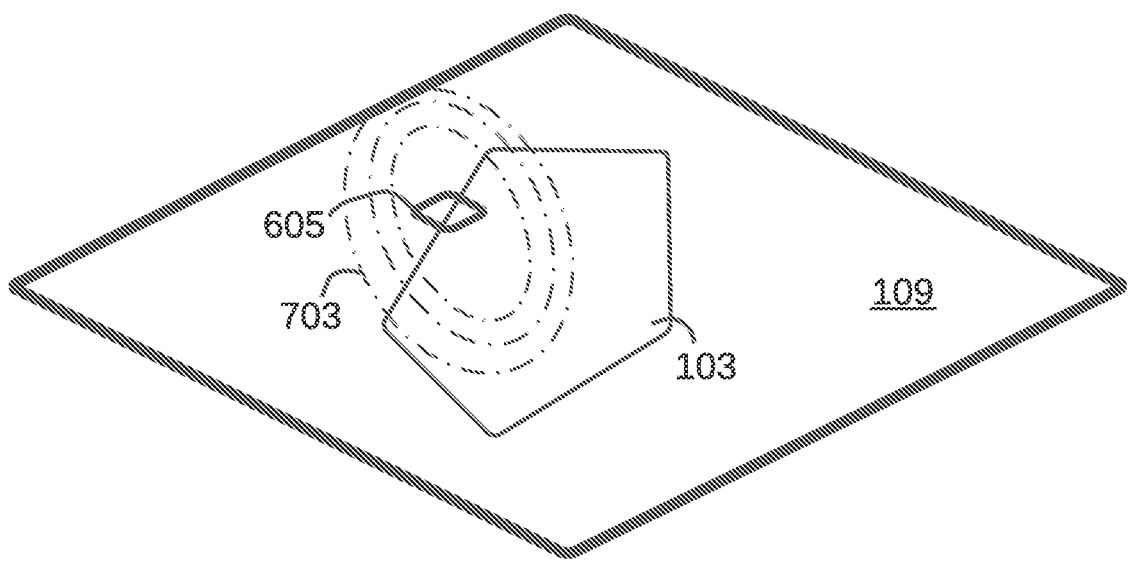

FIGS. 7A and 7B illustrate an adaptive background having a halo effect 703 in an example, according to an embodiment consistent with the principles described herein. A halo effect 703 is generated by modifying a visual parameter 609 from a point outward along the radial direction. The result of modifying the visual parameter 609 outwards is a circle or circular-like pattern with varying color, tint, brightness, or intensity. For example, a center of the halo effect 703 may begin with a green tint and extend radially creating a gradient towards a dark green tint. The halo effect 703 may be fully circular, semi-circular, or otherwise partially circular. The halo effect 703 may be defined by an inner visual parameter 609 and an outer visual parameter 609, where the visual parameter 609 increases or decreases in value between the inner and outer visual parameters 609. The rate of increase or decrease of the visual parameter 609 may be linear or exponential, according to various embodiments.

To generate the halo effect 703, a portion containing a crosstalk violation in a subject image may be identified. This portion of the subject image may be mapped to a corresponding portion 605 of the background image 109. Once the location of the corresponding portion 605 is identified, a halo effect 703 is generated such that the location of the corresponding portion 605 forms a center or outer edge of the halo. Visual parameters 609 of the background image 109 are adjusted to create the halo effect 703 based on the location of the corresponding portion 605. The color, brightness, tint, or intensity of the halo effect 703 may be determined for each color channel. Moreover, the color, brightness, tint, or intensity of the halo effect 703 may be based on the negative pixel values of the pixels corresponding to the crosstalk violation. Pixel values of different pixels may be modified along the radial direction to form the halo effect.

FIG. 7B illustrates overlaying the subject image, which is crosstalk free (e.g., processed according to a crosstalk cancellation operation 305) that is a multiview image 103 over the background image 109 which is adapted to obscure any ghosting effect (e.g., the ghosting effect 415) created by the crosstalk cancellation operation 305. As shown in FIG. 7B, the background image 109 is adapted with a halo effect 703 that is selectively positioned to mask, hide, or obscure a potential ghosting effect appearing at the edge of the subject image. As a result, the blurriness created by the ghosting effect is visually matched the halo effect 703 to provide overall sharpness to the crosstalk-free subject image without modifying the subject image.

Figure 8A:
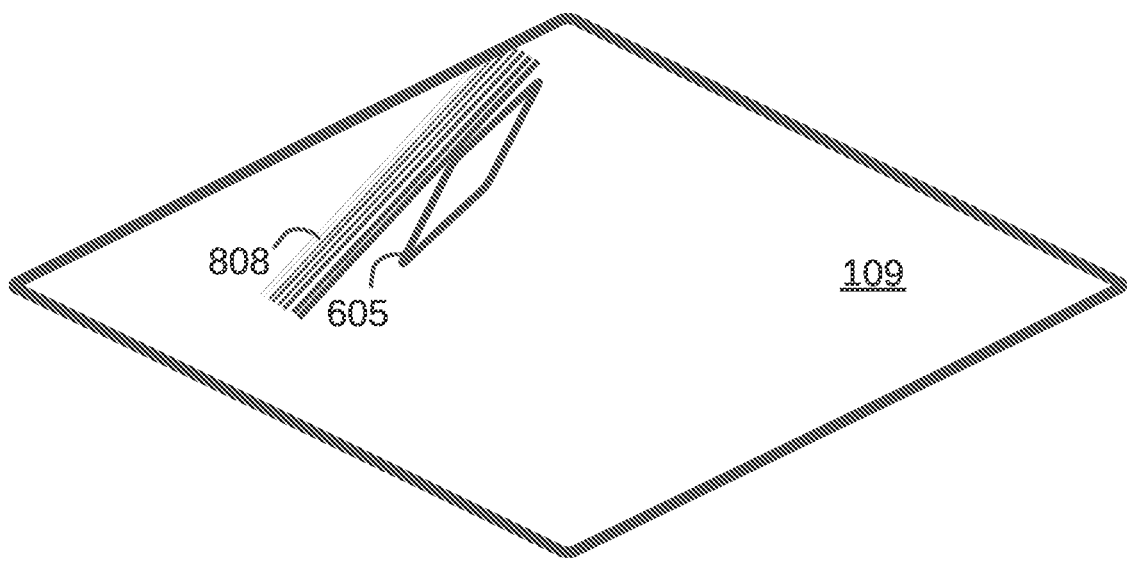
FIGS. 8A and 8B illustrate an adaptive background having a color gradient effect in an example, according to an embodiment consistent with the principles described herein.
Figure 8B:
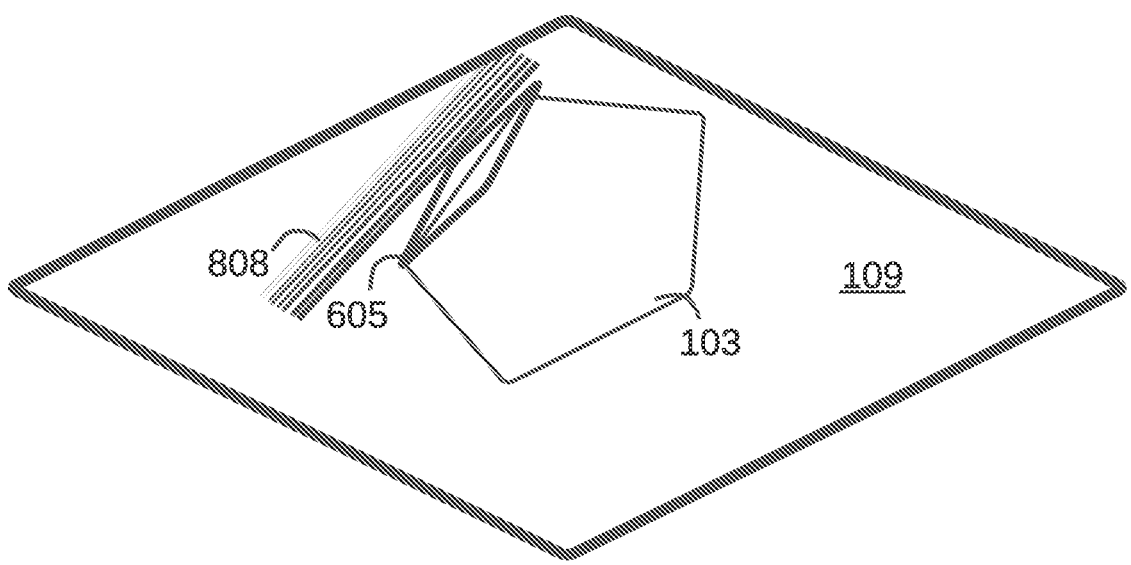

FIGS. 8A and 8B illustrate an adaptive background having a color gradient effect 808 in an example, according to an embodiment consistent with the principles described herein. The color gradient effect 808 is similar to the halo effect 703 described in FIG. 7A but may have the gradient extend along a single direction instead of extending radially. A color gradient effect 808 may have a beginning visual parameter that varies (e.g., increases, decreases) towards an end point. The color gradient effect 808 may begin at a location based on the location of a corresponding portion 605 of a background image 109 that maps to a portion 401 of a subject image containing crosstalk violations. Pixel values of different pixels may be modified along a particular direction to form the gradient effect.

In some embodiments, the location of a portion 401 of a subject image containing crosstalk violations is identified by detecting an edge formed by a set of pixels that correspond to pixel values associated with the crosstalk violation. An edge may be detected by determining whether there is a series of pixels corresponding to crosstalk violations that are arranged or aligned in a particular direction (e.g., horizontal, vertical, diagonal, curved, etc.). An edge may be detected based on whether there is the number of pixels corresponding to a threshold violation along a particular direction exceeds a threshold number. For example, assume the threshold is twenty pixels, if there are at least twenty consecutive pixels corresponding to threshold violations along a particular direction, then this may constitute an edge.

Upon detecting an edge of pixels corresponding to threshold violations, the location of this edge may be recorded. The location may be stored as pixel coordinates. In the example of FIG. 8A, the corresponding portion 605 is determined so that it encompasses an edge of crosstalk violations of the subject image. When generating the background image 109, the location and orientation of the corresponding portion 605 may be used to create the color gradient effect 808. For example, the color gradient effect 808 may be generated so that it begins along the edge and progresses away from the location of the subject image, which may be correspond to the location of the border of the background image 109.

FIG. 8B illustrates overlaying the subject image, which is crosstalk free (e.g., processed according to a crosstalk cancellation operation 305) that is a multiview image 103 over the background image 109 which is adapted to obscure any ghosting effect created by the crosstalk cancellation operation. As shown in FIG. 8B, the background image 109 is adapted with a color gradient effect 808 that is selectively positioned to mask, hide, or obscure a potential ghosting effect 415 appearing at the edge of the subject image. The blurriness created by the ghosting effect may be visually matched the color gradient effect 808 to provide overall sharpness to the crosstalk-free subject image without modifying the subject image.

Figure 9:
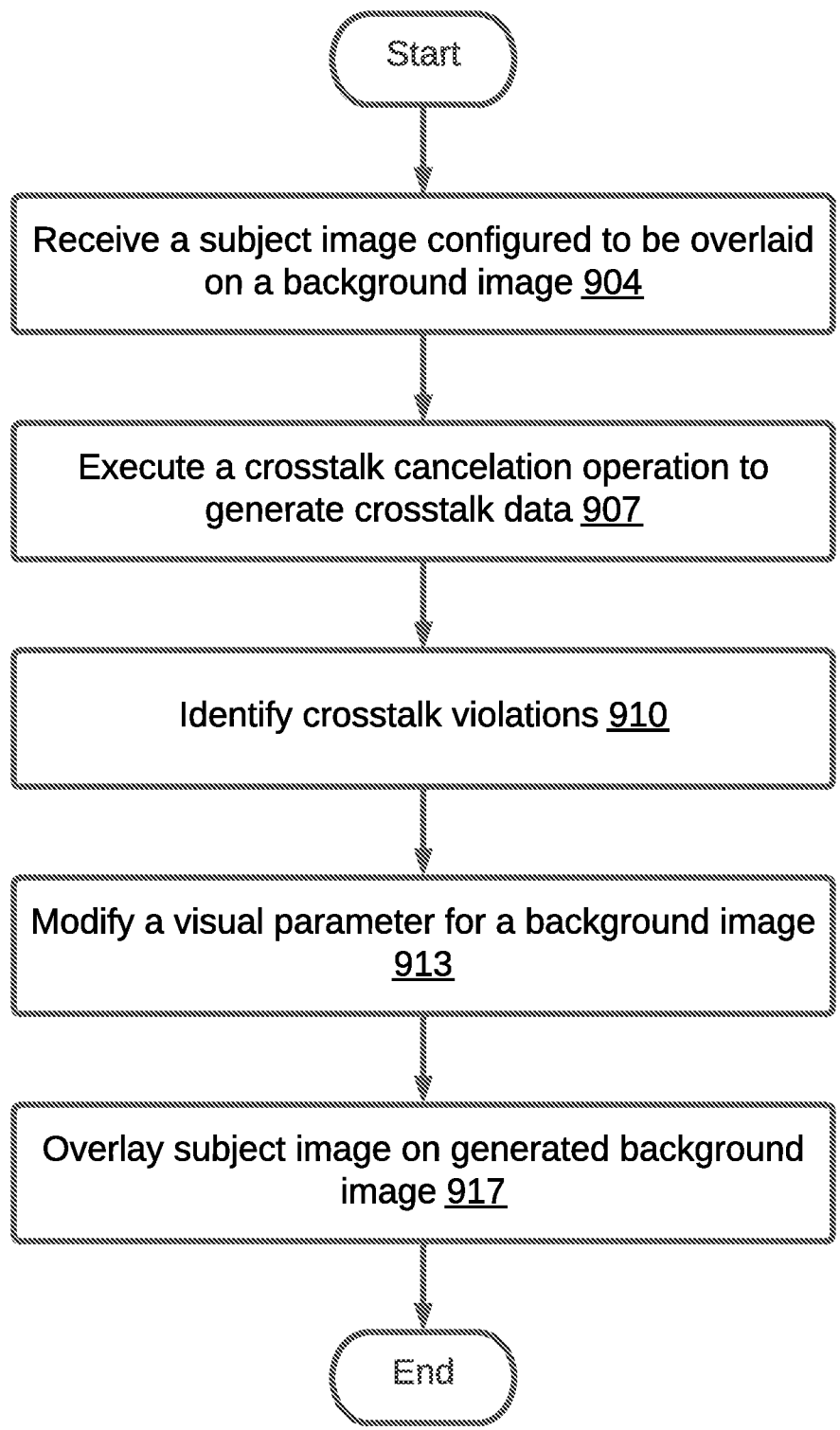
FIG. 9 illustrates a flowchart of a system and method of adapting a background to mitigate view crosstalk in a multiview image, according to an embodiment consistent with the principles described herein.

FIG. 9 is a flowchart illustrating an example of the functionality of adapting a background of a multiview image according to various embodiments. The flowchart of FIG. 9 provides one example of the different types of functionality implemented by an application or other instruction set executable by a computing device. As an alternative, the flowchart of FIG. 9 may be viewed as depicting an example of elements of a method implemented in a computing device according to one or more embodiments.

At item 904, the computing device receives a subject image, where the subject image is configured to be overlaid on a background image (e.g., background image 109). The subject image may be a multiview image 103 made up of two or more views. The subject image may be formatted in an image format that is defined by a plurality of color channels. For example, the image format may be an RGB format (Red Green Blue format) of similar format that records pixel values for different color channels.

The subject image may be generated by extracting the content of a subject from an initial image. In this respect, the resulting subject image may have no background or otherwise a default background (e.g., a pure black background). For example, the subject image may be extracted from an initial image and overlaid on a default background, where the default background has pixels values set to zero for each color channel.

At item 907, the computing device executes a crosstalk cancellation operation to generate crosstalk data. For example, the crosstalk cancellation operation 305 described above may be used to generate crosstalk data 509a-n. The crosstalk cancellation operation may be performed for each color channel of the subject image, according to various embodiments resulting in separately generated crosstalk data for each color channel. For example, the computing device may generate red channel crosstalk data, green channel crosstalk data, and blue channel crosstalk data if there are three color channels for a subject image formatted in an RGB format. The crosstalk data is used to minimize crosstalk in the subject image. As explained above, the crosstalk cancellation operation 305 may involve matrix subtraction operations to remove unintended views from leaking into the intended view. For example, the pixel values of a first view (e.g., first view 106a) may be subtracted from the pixel values of the subject image at a particular location to emphasize a second view (e.g., second view 106b). Thus, the crosstalk cancellation operation may remove red, green, and blue pixel values from the subject image to isolate a single view for a particular perspective.

At item 910, the computing device identifies crosstalk violations. The crosstalk data may include one or more crosstalk violations. The crosstalk violation may be determined based on a negative pixel value in the subject image. This applies a threshold of a zero pixel value. In some embodiments, the degree of negativity of the pixel value may be considered in determining whether a pixel corresponds to a crosstalk violation. For example, a crosstalk violation 507 may be detected if the pixel value is more negative (e.g., less) than minus ten (−10).

In some embodiments, crosstalk violations 507 are determined based on an average (e.g., mean, median, mode) of pixel values over a portion (e.g., the portion 401) made up of multiple pixels. If the average pixel value falls below a threshold value (e.g., zero), then the portion of pixels may be considered as containing a crosstalk violation. Portions of the subject image containing crosstalk violations may be located, referenced, and identified according to a pixel-based coordinate system.

Crosstalk violations may be quantified so as to determine the degree of crosstalk violation. For example, an average pixel value may be determined for all pixels corresponding to negative pixels. If crosstalk violations are defined as negative pixels, then the average degree of crosstalk violation may be determined by averaging the pixel value only for negative pixels.

Embodiments are therefore directed to identifying crosstalk violations within the crosstalk data. The location of the crosstalk violations may be recorded (e.g., storing the pixel coordinates of pixels corresponding to a crosstalk violation), the degree of crosstalk violations may be recorded (e.g., storing the pixel values or other statistical data based on the pixel values for pixels corresponding to a crosstalk violation, or a combination thereof.

Because crosstalk violations (e.g., the presence of negative pixels) may be introduced through the crosstalk cancellation process, crosstalk violations may be removed by setting negative pixel values to zero or some other minimum value defined by the image format. For example, an image format may define pixel values to be between 0 and 255. If the crosstalk cancellation operation results in pixel values below this range (e.g., negative pixel values), this results in a crosstalk violation. Such crosstalk violations may be removed by setting the pixel value to the minimum (e.g., 0) while also tracking the crosstalk violation to generate an adaptive background.

At item 913, the computing device modifies a visual parameter (e.g., the visual parameter 609) for a background image (e.g., the background image 109). The visual parameter may be a color value or a brightness value. The visual parameter may affect the color, tint, brightness, or intensity of the background image. The visual parameter may be a pixel value for a particular color channel (e.g., a red channel, green channel, blue channel, etc.) The visual parameter may be determined based on the detection of a crosstalk violation, according to various embodiments. If removing the crosstalk violation results in adding an amount of red and green color from the subject image, then a similar amount of red and green may be added to the background image to match the color resulting from removing the crosstalk violation. For example, a crosstalk cancellation operation may result in a pixel having a red channel pixel value of minus seventy (−70), a green channel pixel value of minus one hundred (−100), and a blue channel pixel value of positive eighty (80). This particular pixel may be identified as a pixel having a crosstalk violation with respect to the red and green channels but not the blue channel, due to the presence of negative pixels. While crosstalk is removed from the subject image, the crosstalk violations may be removed by setting negative pixel values to zero, thereby increasing the color values. In this example, the pixel may have its red and green channel pixel values set to zero while its blue channel pixel value remains at eighty (80). The removal of the crosstalk violation causes an increase in red and green pixel values for the pixel in the subject image by converting negative pixel values to zero.

To create an adaptive background that alleviates the ghosting effect, a visual parameter of the background image is modified to compensate or match the removal of the crosstalk violation. This creates a visual effect where the background is adapted to blend with the ghosting effect by increasing color and/or brightness values of the background image. Using the example above, pixel values of the background image may be increased by seventy (70) for the red channel and may be increased by one hundred (100) for the green channel. The increase in these values may be at or near the location of the crosstalk violations of the subject image or may be applied globally. If the background image begins as a default black image, then at least some pixels may be set to a value of seventy (70) for the red channel and one hundred (100) for the green channel.

The crosstalk violation may be quantified for a particular pixel, a portion encompassing multiple pixels, or for the entire subject image, according to various embodiments. In some embodiments, when covering multiple pixels, the crosstalk violation may be quantified as an average pixel value for each color channel.

After determining the visual parameter, the visual parameter is applied to the background image to make the background image adaptive so that it masks or hides inadvertent visual artifacts resulting from the crosstalk cancellation operation. The background image may begin with a default image such as a background having a uniform color. In some embodiments, the background image begins as a default black image where all color values are set to zero. Then, the visual parameter is applied to the default background image. In some embodiments, a color value of the default background image is uniformly increased based on the degree of crosstalk violation. Increasing a color value of the default background image may involve adding a particular color or tint to the default background image, where the color value of the color tint is determined by tracking the degree of crosstalk violation.

In some embodiments, the location of a portion associated with a crosstalk violation is used to adjust the visual properties of a corresponding portion having a corresponding location in the background image. For example, if the upper left of the subject image contains a large degree of crosstalk violation in the blue channel, then a similar degree of blue (e.g., a blue pixel value) may be added to the upper left portion of the background image.

In some embodiments, the location of the portion associated with crosstalk violation is identified and mapped to a corresponding portion of the background image. A halo effect (e.g., halo effect 703), gradient effect (e.g., color gradient effect 808), or other visual effect may be applied based on the corresponding portion of the background image. The visual parameter may be varied to achieve the visual effect by adding color or brightness that reflects the color lost due to the crosstalk cancellation operation.

At item 917, the computing device overlays subject image on generated background image. The subject image is the multiview image that may have been modified by the crosstalk cancellation operation. In this respect, the subject image is considered 'crosstalk free' such that crosstalk is reduced or minimized. In addition, the adaptive background is generated by performing the crosstalk cancellation operation, tracking crosstalk violations, removing the crosstalk violations, and modifying visual parameters of the background image to compensate for the increase in color resulting from removing crosstalk violations. This results in the background image being adaptive so that it blends with the visual artifacts introduced by the crosstalk cancellation operation.

At item 917, the crosstalk-free subject image is overlaid on the background image. Overlaying the crosstalk-free subject image may involve adding pixels values from the background image with corresponding pixel values of the subject image. A final image, which is one in which the subject image (which is crosstalk-free) is overlaid on the background image (which is adaptive based on intelligently applying a visual parameter) may then be rendered for display on a multiview display (e.g., the multiview display 112).

While embodiments are directed to a subject image to be overlaid on a background image that is adapted to compensate for visual artifacts introduced through crosstalk cancellation, other embodiments are directed to operating on multiview image that begins with both a subject image and background image combined. A subject image may be identified from the multiview image. For example, a user may select a region of the multiview image to designate as the subject image. In other embodiments, computer image recognition techniques may automatically identify a subject image within the multiview image. Edge detection operations may automatically identify a subject image within the multiview image. After identifying the subject image, the remainder of the multiview image may be designated as the background image. A crosstalk cancellation operation may be performed on the subject image. Crosstalk violations may be identified, tracked, and removed. Based on the crosstalk violation's location, the degree, or both, the visual parameters of the background image may be modified to compensate for the increase in color due to removing the crosstalk violations. The resulting image is a multiview image where the identified subject is crosstalk-free and where the background is adapted to obscure any ghosting effect caused by crosstalk cancelation.

The flowchart of FIG. 9 discussed above may illustrate a system or method of adapting a background image having the functionality and operation of an implementation of an instruction set. If embodied in software, each box may represent a module, segment, or portion of code that comprises instructions to implement the specified logical function(s). The instructions may be embodied in the form of source code that comprises human-readable statements written in a programming language, object code that is compiled from source code, or machine code that comprises numerical instructions recognizable by a suitable execution system, such as a processor of a computing device. The machine code may be converted from the source code, etc. If embodied in hardware, each block may represent a circuit or a number of interconnected circuits to implement the specified logical function(s).

Although the flowchart of FIG. 9 shows a specific order of execution, it is understood that the order of execution may differ from that which is depicted. For example, the order of execution of two or more boxes may be scrambled relative to the order shown. Also, two or more boxes shown may be executed concurrently or with partial concurrence. Further, in some embodiments, one or more of the boxes may be skipped or omitted.

Figure 10:
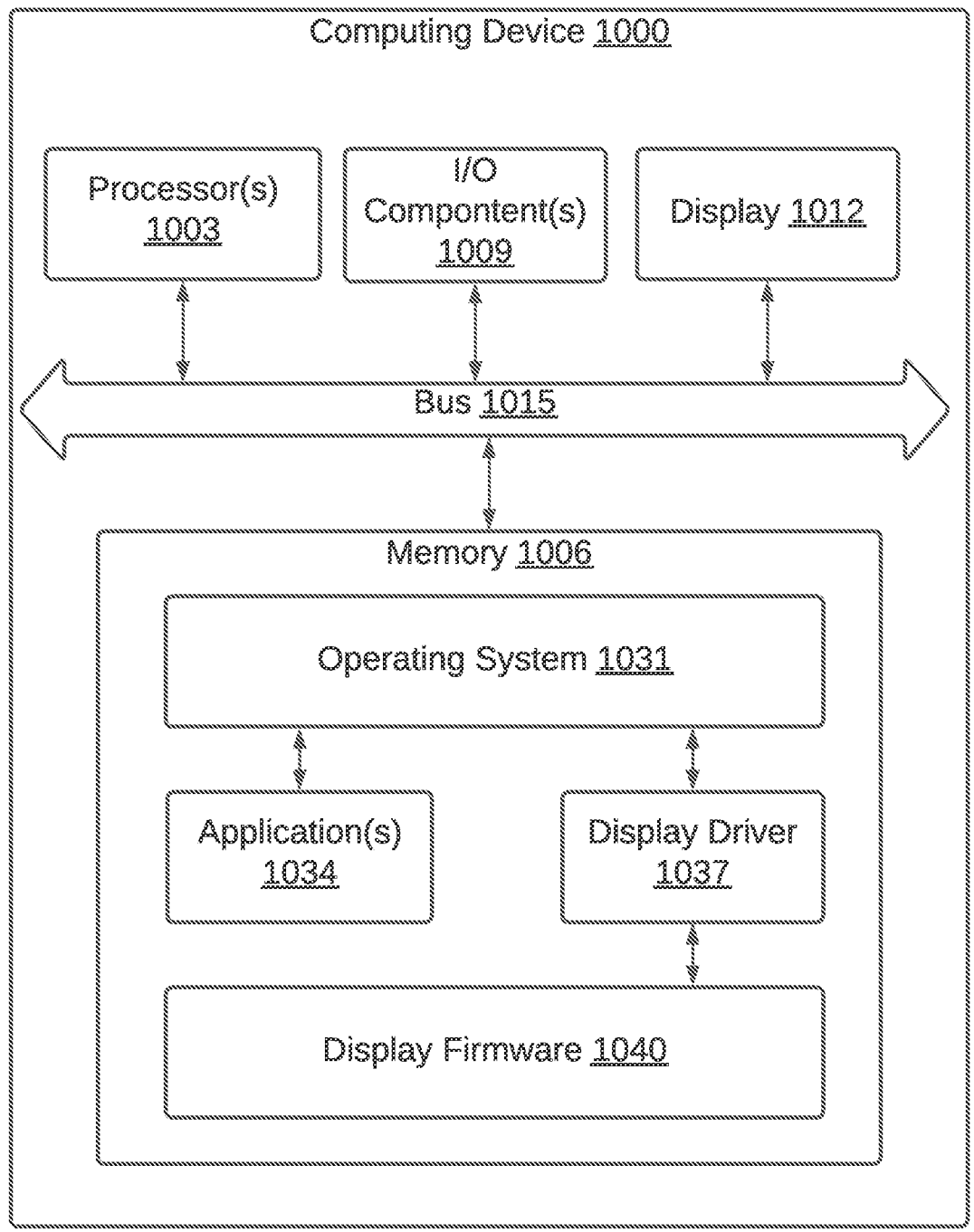
FIG. 10 illustrates a schematic block diagram that depicts one example illustration of a computing device providing a multiview display according to various embodiments of the present disclosure.

FIG. 10 is a schematic block diagram that depicts an example illustration of a computing device 1000 providing a multiview display, according to various embodiments of the present disclosure. The computing device 1000 may include a system of components that carry out various computing operations for a user of the computing device 1000. The computing device 1000 may be a laptop, tablet, smart phone, touch screen system, intelligent display system, or other client device. The computing device 1000 may include various components such as, for example, a processor(s) 1003, a memory 1006, input/output (I/O) component(s) 1009, a display 1012, and potentially other components. These components may couple to a bus 1015 that serves as a local interface to allow the components of the computing device 1000 to communicate with each other. While the components of the computing device 1000 are shown to be contained within the computing device 1000, it should be appreciated that at least some of the components may couple to the computing device 1000 through an external connection. For example, components may externally plug into or otherwise connect with the computing device 1000 via external ports, sockets, plugs, or connectors.

A processor 1003 may be a central processing unit (CPU), graphics processing unit (GPU), or any other integrated circuit that performs computing processing operations. The processor(s) 1003 may include one or more processing cores. The processor(s) 1003 comprises circuitry that executes instructions. Instructions include, for example, computer code, programs, logic, or other machine-readable instructions that are received and executed by the processor(s) 1003 to carry out computing functionality that are embodied in the instructions. The processor(s) 1003 may execute instructions to operate on data. For example, the processor(s) 1003 may receive input data (e.g., an image), process the input data according to an instruction set, and generate output data (e.g., a processed image). As another example, the processor(s) 1003 may receive instructions and generate new instructions for subsequent execution.

The memory 1006 may include one or more memory components. The memory 1006 is defined herein as including either or both of volatile and nonvolatile memory. Volatile memory components are those that do not retain information upon loss of power. Volatile memory may include, for example, random access memory (RAM), static random access memory (SRAM), dynamic random access memory (DRAM), magnetic random access memory (MRAM), or other volatile memory structures. System memory (e.g., main memory, cache, etc.) may be implemented using volatile memory. System memory refers to fast memory that may temporarily store data or instructions for quick read and write access to assist the processor(s) 1003.

Nonvolatile memory components are those that retain information upon a loss of power. Nonvolatile memory includes read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive. The ROM may comprise, for example, a programmable read-only memory (PROM), an erasable programmable read-only memory (EPROM), an electrically erasable programmable read-only memory (EEPROM), or other like memory device. Storage memory may be implemented using nonvolatile memory to provide long term retention of data and instructions.

The memory 1006 may refer to the combination of volatile and nonvolatile memory used to store instructions as well as data. For example, data and instructions may be stored in nonvolatile memory and loaded into volatile memory for processing by the processor(s) 1003. The execution of instructions may include, for example, a compiled program that is translated into machine code in a format that can be loaded from nonvolatile memory into volatile memory and then run by the processor 1003, source code that is converted in suitable format such as object code that is capable of being loaded into volatile memory for execution by the processor 1003, or source code that is interpreted by another executable program to generate instructions in volatile memory and executed by the processor 1003, etc. Instructions may be stored or loaded in any portion or component of the memory 1006 including, for example, RAM, ROM, system memory, storage, or any combination thereof.

While the memory 1006 is shown as being separate from other components of the computing device 1000, it should be appreciated that the memory 1006 may be embedded or otherwise integrated, at least partially, into one or more components. For example, the processor(s) 1003 may include onboard memory registers or cache to perform processing operations.

I/O component(s) 1009 include, for example, touch screens, speakers, microphones, buttons, switches, dials, camera, sensors, accelerometers, or other components that receive user input or generate output directed to the user. I/O component(s) 1009 may receive user input and convert it into data for storage in the memory 1006 or for processing by the processor(s) 1003. I/O component(s) 1009 may receive data outputted by the memory 1006 or processor(s) 1003 and convert them into a format that is perceived by the user (e.g., sound, tactile responses, visual information, etc.).

A specific type of I/O component 1009 is a display 1012. The display 1012 may include a multiview display, a multiview display combined with a 2D display, or any other display that presents images. A capacitive touch screen layer serving as an I/O component 1009 may be layered within the display to allow a user to provide input while contemporaneously perceiving visual output. The processor(s) 1003 may generate data that is formatted as an image for presentation on the display 1012. The processor(s) 1003 may execute instructions to render the image on the display for perception by the user.

The bus 1015 facilitates communication of instructions and data between the processor(s) 1003, the memory 1006, the I/O component(s) 1009, the display 1012, and any other components of the computing device 1000. The bus 1015 may include address translators, address decoders, fabric, conductive traces, conductive wires, ports, plugs, sockets, and other connectors to allow for the communication of data and instructions.

The instructions within the memory 1006 may be embodied in various forms in a manner that implements at least a portion of the software stack. For example, the instructions may be embodied as an operating system 1031, an application(s) 1034, a device driver (e.g., a display driver 1037), firmware (e.g., display firmware 1040), or other software components. The operating system 1031 is a software platform that supports the basic functions of the computing device 1000, such as scheduling tasks, controlling I/O components 1009, providing access to hardware resources, managing power, and supporting applications 1034.

An application(s) 1034 executes on the operating system 1031 and may gain access to hardware resources of the computing device 1000 via the operating system 1031. In this respect, the execution of the application(s) 1034 is controlled, at least in part, by the operating system 1031. The application(s) 1034 may be a user-level software program that provides high-level functions, services, and other functionality to the user. In some embodiments, an application 1034 may be a dedicated 'app' downloadable or otherwise accessible to the user on the computing device 1000. The user may launch the application(s) 1034 via a user interface provided by the operating system 1031. The application(s) 1034 may be developed by developers and defined in various source code formats. The applications 1034 may be developed using a number of programming or scripting languages such as, for example, C, C++, C#, Objective C, Java©, Swift, JavaScript©, Perl, PUP, Visual Basic©, Python©, Ruby, Go, or other programming languages. The application(s) 1034 may be compiled by a compiler into object code or interpreted by an interpreter for execution by the processor(s) 1003.

Device drivers such as, for example, the display driver 1037, include instructions that allow the operating system 1031 to communicate with various I/O components 1009. Each I/O component 1009 may have its own device driver. Device drivers may be installed such that they are stored in storage and loaded into system memory. For example, upon installation, a display driver 1037 translates a high-level display instruction received from the operating system 1031 into lower level instructions implemented by the display 1012 to display an image.

Firmware, such as, for example, display firmware 1040, may include machine code or assembly code that allows an I/O component 1009 or display 1012 to perform low-level operations. Firmware may convert electrical signals of particular component into higher level instructions or data. For example, display firmware 1040 may control how a display 1012 activates individual pixels at a low level by adjusting voltage or current signals. Firmware may be stored in nonvolatile memory and executed directly from nonvolatile memory. For example, the display firmware 1040 may be embodied in a ROM chip coupled to the display 1012 such that the ROM chip is separate from other storage and system memory of the computing device 1000. The display 1012 may include processing circuitry for executing the display firmware 1040.

The operating system 1031, application(s) 1034, drivers (e.g., display driver 1037), firmware (e.g., display firmware 1040), and potentially other instruction sets may each comprise instructions that are executable by the processor(s) 1003 or other processing circuitry of the computing device 1000 to carry out the functionality and operations discussed above. Although the instructions described herein may be embodied in software or code executed by the processor(s) 1003 as discussed above, as an alternative, the instructions may also be embodied in dedicated hardware or a combination of software and dedicated hardware. For example, the functionality and operations carried out by the instructions discussed above may be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc.

In some embodiments, the instructions that carry out the functionality and operations discussed above may be embodied in a non-transitory, computer-readable storage medium. The computer-readable storage medium may or may not be part of the computing device 1000. The instructions may include, for example, statements, code, or declarations that can be fetched from the computer-readable medium and executed by processing circuitry (e.g., the processor(s) 1003). In the context of the present disclosure, a 'computer-readable medium' may be any medium that can contain, store, or maintain the instructions described herein for use by or in connection with an instruction execution system, such as, for example, the computing device 1000.

The computer-readable medium can comprise any one of many physical media such as, for example, magnetic, optical, or semiconductor media. More specific examples of a suitable computer-readable medium may include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

The computing device 1000 may perform any of the operations or implement the functionality descried above. For example, the flowchart and process flows discussed above may be performed by the computing device 1000 that executes instructions and processes data. While the computing device 1000 is shown as a single device, the present disclosure is not so limited. In some embodiments, the computing device 1000 may offload processing of instructions in a distributed manner such that a plurality of computing devices 1000 operate together to execute instructions that may be stored or loaded in a distributed arranged. For example, at least some instructions or data may be stored, loaded, or executed in a cloud-based system that operates in conjunction with the computing device 1000.

Thus, there have been described examples and embodiments of adapting a background of a multiview image, tracking crosstalk violations, and adjusting a visual parameter of a background image 109 to mask or hide ghosting effects and other undesirable visual artifacts created by a crosstalk cancellation operation. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A computer-implemented method of adapting a background of a multiview image, the method comprising:
    generating crosstalk data to reduce crosstalk between a first view of a subject image and a second view of the subject image, the subject image comprising a multiview image to be overlaid on a background image;
    identifying a crosstalk violation in the crosstalk data, wherein the crosstalk violation is determined based on a pixel value of the subject image falling below a specified threshold pixel value;
    modifying a visual parameter of the background image based on at least one of a location or degree of the crosstalk violation to compensate for removing the crosstalk violation in the subject image; and
    overlaying the subject image on the background image, the subject image and background image being rendered on a multiview display.

2. The method of adapting a background of a multiview image of claim 1, wherein generating the crosstalk data comprises separately generating the crosstalk data for each color channel of the first view of the subject image and the second view of the subject image.

3. The method of adapting a background of a multiview image of claim 1, wherein the crosstalk violation is determined based on a negative pixel value of the subject image.

4. The method of adapting a background of a multiview image of claim 1, wherein modifying the visual parameter comprises increasing at least one of a color value or a brightness value of the background image based on the location of the crosstalk violation.

5. The method of adapting a background of a multiview image of claim 1, wherein the background image comprises at least one of a halo or color gradient positioned according to the location of the crosstalk violation.

6. The method of adapting a background of a multiview image of claim 1, wherein the crosstalk violation is removed from the subject image by setting pixel values corresponding to the crosstalk violation to zero.

7. The method of adapting a background of a multiview image of claim 1, further comprising identifying the location of the crosstalk violation by detecting an edge formed by a set of pixels that correspond to pixel values associated with the crosstalk violation.

8. A multiview image display system employing an adaptive background, the system comprising:
- a processor; and
- a memory that stores a plurality of instructions, which, when executed, cause the processor to:
  - receive a subject image configured to be overlaid on a background image, the subject image being a multiview image;
  - execute a crosstalk cancellation operation to generate crosstalk data based on a first view of the subject image and a second view of the subject image;
  - identify a portion of the subject image associated with a crosstalk violation based on the crosstalk data, wherein the crosstalk violation is based on a pixel value of the subject image falling below a specified threshold pixel value; and
  - modify a visual parameter of the background image at a location corresponding to the identified portion of the subject image, the subject image and background image configured to be rendered on a multiview display.

9. The multiview image display system employing an adaptive background of claim 8, wherein the crosstalk violation is determined based on a negative pixel value in the subject image.

10. The multiview image display system employing an adaptive background of claim 8, wherein the subject image is formattable in format defined by a plurality of color channels.

11. The multiview image display system employing an adaptive background of claim 10, wherein the crosstalk data is generated separately for each color channel among the plurality of color channels.

12. The multiview image display system employing an adaptive background of claim 8, wherein the visual parameter comprises at least one of a color pixel value or a brightness pixel value.

13. The multiview image display system employing an adaptive background of claim 8, wherein the plurality of instructions, which, when executed, further cause the processor to determine the visual parameter to generate at least one of a halo effect or color gradient based on identifying a location of the portion of the subject image and mapping the location to the location on the background image.

14. The multiview image display system employing an adaptive background of claim 8, wherein the crosstalk violation is removed from the subject image by setting a pixel value corresponding to the crosstalk violation to zero, the visual parameter being modified to compensate for removing the crosstalk violation.

15. The multiview image display system employing an adaptive background of claim 8, wherein the plurality of instructions, which, when executed, further cause the processor to identify a location of the portion by identifying a group of pixels having an average pixel value that falls below a threshold pixel value.

16. A non-transitory, computer-readable storage medium storing executable instructions that, when executed by a processor of a computer system, implement adapting a background image comprising:
- generating crosstalk data to reduce crosstalk between a first view of subject image and a second view of the subject image, the subject image comprising a multiview image;
- detecting a crosstalk violation in the subject image based on the crosstalk data, wherein the crosstalk violation is based on a pixel value of the subject image falling below a specified threshold pixel value;
- modifying at a pixel value of the background image according to a degree of the crosstalk violation; and
- overlaying the subject image on the background image, the subject image and background image configured to be rendered on a multiview display.

17. The non-transitory, computer-readable storage medium of claim 16, wherein the executable instructions that, when executed by the processor of the computer system, further implement adapting the background image comprising:
- determining a location of a portion of the subject image that corresponds to the crosstalk violation; and
- setting the pixel value of the background image according to the determined location.

18. The non-transitory, computer-readable storage medium of claim 17, wherein the pixel value of the background image comprises a pixel values of different pixels that are set to form a halo positioned according to the location of the portion.

19. The non-transitory, computer-readable storage medium of claim 17, wherein the pixel value of the background image comprises a plurality of different pixel values that are set to form a color gradient based on the location of the portion.

20. The non-transitory, computer-readable storage medium of claim 16, wherein generating the crosstalk data comprises separately generating crosstalk data for each color channel of the first view of the subject image and the second view of the subject image.

* * * * *